US012564948B2

(12) United States Patent
Feng et al.

(10) Patent No.: US 12,564,948 B2
(45) Date of Patent: Mar. 3, 2026

(54) AUTONOMOUS OPERATION DECISION-MAKING METHOD OF PICKING MANIPULATOR

(71) Applicant: RESEARCH CENTER OF INTELLIGENT EQUIPMENT, BAAFS, Beijing (CN)

(72) Inventors: Qingchun Feng, Beijing (CN); Yajun Li, Beijing (CN); Yifan Zhang, Beijing (CN); Chuanlang Peng, Beijing (CN)

(73) Assignee: RESEARCH CENTER OF INTELLIGENT EQUIPMENT, BAAFS, Beijing (CN)

( * ) Notice: Subject to any disclaimer, the term of this patent is extended or adjusted under 35 U.S.C. 154(b) by 50 days.

(21) Appl. No.: 18/660,444

(22) Filed: May 10, 2024

(65) Prior Publication Data

US 2025/0083310 A1     Mar. 13, 2025

(30) Foreign Application Priority Data

Sep. 7, 2023     (CN) ......................... 202311150071.5

(51) Int. Cl.
 *B25J 9/16* (2006.01)
 *A01D 46/30* (2006.01)
 *B65G 47/90* (2006.01)
(52) U.S. Cl.
 CPC .............. *B25J 9/163* (2013.01); *A01D 46/30* (2013.01); *B25J 9/1602* (2013.01); *B25J 9/1605* (2013.01); *B25J 9/1666* (2013.01); *B25J 9/1669* (2013.01); *B25J 9/1671* (2013.01); *B65G 47/905* (2013.01); *B25J 9/1664* (2013.01); *B65G 2201/0211* (2013.01); *G05B 2219/45106* (2013.01)

(58) Field of Classification Search
 CPC ........ B25J 9/163; B25J 9/1602; B25J 9/1605; B25J 9/1666; B25J 9/1669; B25J 9/1671; B25J 9/1664; A01D 46/30; B65G 47/905; B65G 2201/0211; G05B 2219/45106
 See application file for complete search history.

(56) References Cited

U.S. PATENT DOCUMENTS

2018/0272535 A1* 9/2018 Ogawa ................... B25J 13/085
2019/0261566 A1* 8/2019 Robertson ................ G06T 7/50
(Continued)

*Primary Examiner* — Sohana Tanju Khayer
(74) *Attorney, Agent, or Firm* — Miles & Stockbridge PC; Ajay A. Jagtiani

(57) ABSTRACT

The present application relates to the technical field of manipulators and provides an autonomous operation decision-making method of a picking manipulator. The autonomous operation decision-making method of a picking manipulator includes: acquiring sample images of fruits and branches and constructing a plurality of virtual scenes, where each virtual scene includes a picking manipulator model, a fruit model, and a branch model; in the virtual scene, determining azimuths of a target picking point and a target picking plane of an end effector model as parameters and inputting the parameters to a reward function; performing reinforcement learning training on the picking manipulator in the plurality of virtual scenes according to the reward function to determine an optimal picking action function; and controlling the picking manipulator to execute a picking task in an actual environment according to the optimal picking action function.

6 Claims, 5 Drawing Sheets

S101 Acquire sample images of fruits and branches and construct a plurality of virtual scenes, where each of the plurality of virtual scenes includes a picking manipulator model, a fruit model, and a branch model S102 In the virtual scene, determine a target picking point and a target picking plane of an end effector model, and input azimuth information of the target picking point and the target picking plane as parameters to a reward function S103 Perform reinforcement learning training on picking action flows of the picking manipulator in the plurality of virtual scenes according to the reward function to determine an optimal picking action function S104 Control the picking manipulator to execute a picking task in an actual environment according to the optimal picking action function

(56) References Cited

U.S. PATENT DOCUMENTS

| 2020/0008355 | A1* | 1/2020 | Nir | A01D 46/30 |
|---|---|---|---|---|
| 2020/0323140 | A1* | 10/2020 | Gielis | A01D 46/24 |
| 2022/0016765 | A1* | 1/2022 | Ku | B25J 9/1612 |
| 2022/0016766 | A1* | 1/2022 | Humayun | G06T 7/73 |
| 2022/0270198 | A1* | 8/2022 | Han | H04N 23/90 |
| 2023/0116896 | A1* | 4/2023 | Hamilton | B25J 9/1666 |
| | | | | 701/50 |
| 2023/0256601 | A1* | 8/2023 | Ku | B25J 9/1605 |
| | | | | 700/250 |
| 2023/0294277 | A1* | 9/2023 | Yang | G05B 19/4155 |
| | | | | 700/217 |
| 2023/0297068 | A1* | 9/2023 | Li | B25J 9/1697 |
| | | | | 700/98 |
| 2023/0405820 | A1* | 12/2023 | Huang | B25J 9/163 |
| 2024/0198515 | A1* | 6/2024 | Aparicio Ojea | G06T 7/70 |
| 2024/0246239 | A1* | 7/2024 | Sun | B25J 13/08 |
| 2025/0010473 | A1* | 1/2025 | Sawa | B25J 9/1697 |
| 2025/0113776 | A1* | 4/2025 | Knopf | A01D 46/30 |
| 2025/0160253 | A1* | 5/2025 | Chen | A01D 46/30 |
| 2025/0262770 | A1* | 8/2025 | Jiang | B25J 9/1697 |

* cited by examiner

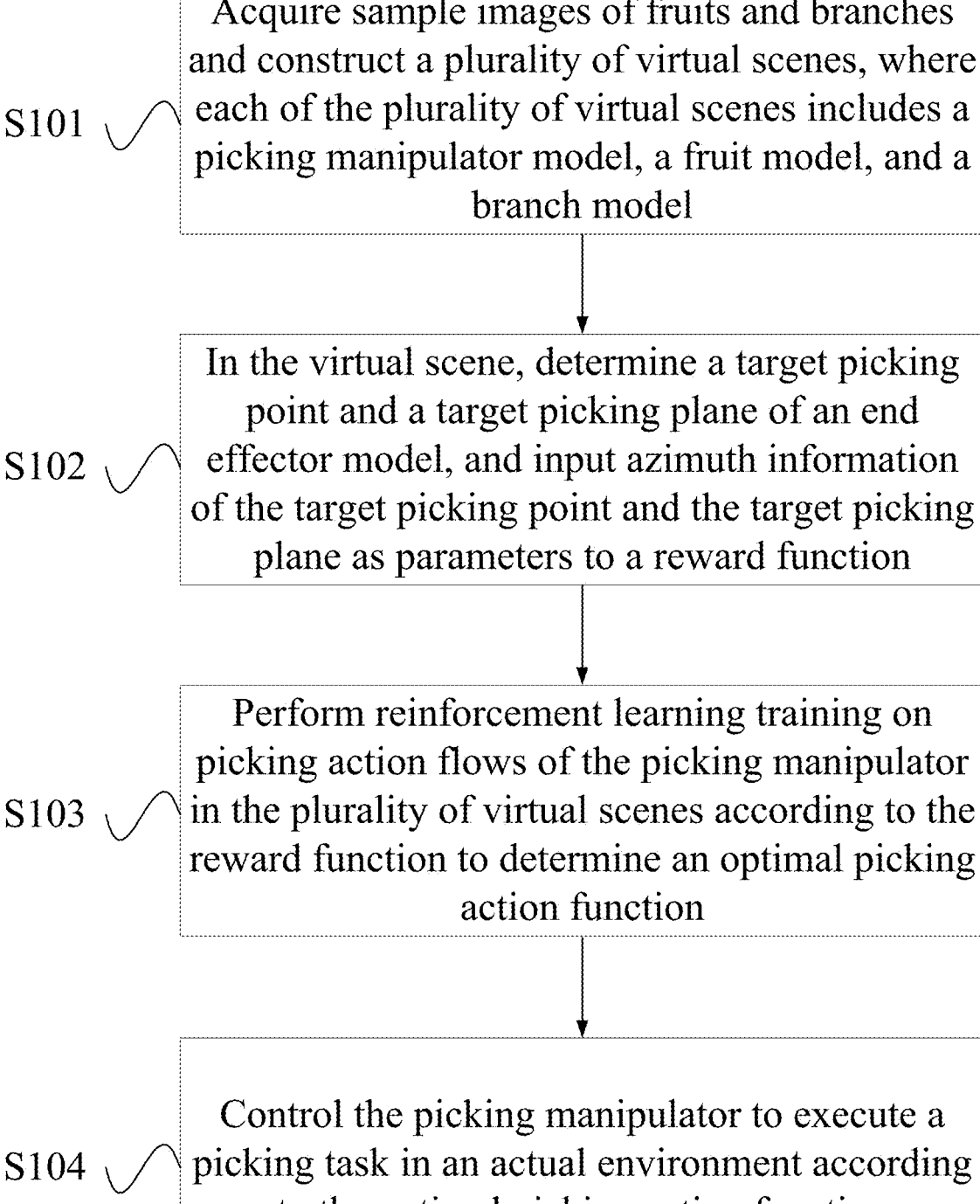

S101

Acquire sample images of fruits and branches and construct a plurality of virtual scenes, where each of the plurality of virtual scenes includes a picking manipulator model, a fruit model, and a branch model

S102

In the virtual scene, determine a target picking point and a target picking plane of an end effector model, and input azimuth information of the target picking point and the target picking plane as parameters to a reward function

S103

Perform reinforcement learning training on picking action flows of the picking manipulator in the plurality of virtual scenes according to the reward function to determine an optimal picking action function

S104

Control the picking manipulator to execute a picking task in an actual environment according to the optimal picking action function

FIG. 1

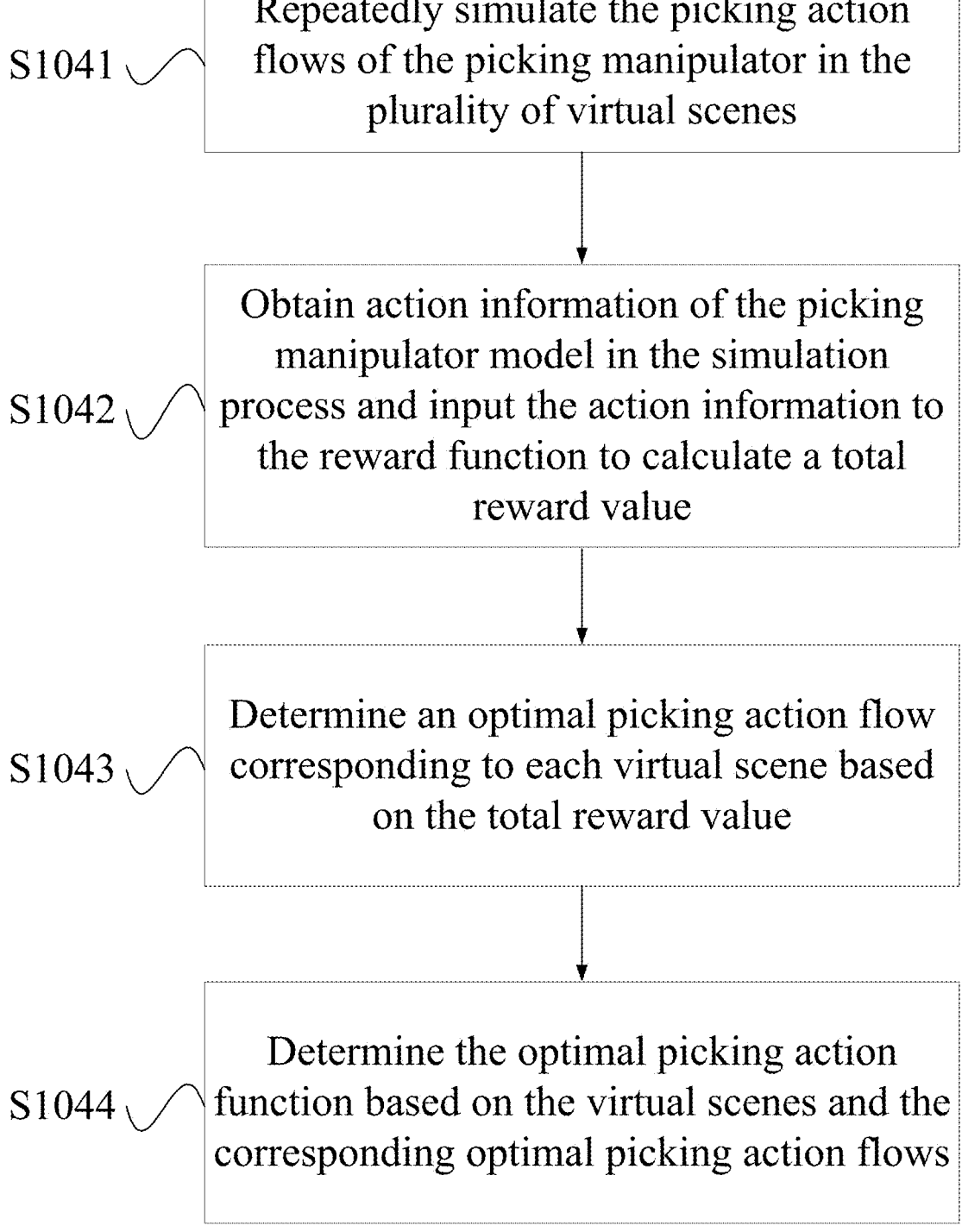

S1041

Repeatedly simulate the picking action flows of the picking manipulator in the plurality of virtual scenes

S1042

Obtain action information of the picking manipulator model in the simulation process and input the action information to the reward function to calculate a total reward value

S1043

Determine an optimal picking action flow corresponding to each virtual scene based on the total reward value

S1044

Determine the optimal picking action function based on the virtual scenes and the corresponding optimal picking action flows

AUTONOMOUS OPERATION DECISION-MAKING METHOD OF PICKING MANIPULATOR

CROSS REFERENCE TO RELATED APPLICATION

This patent application claims the benefit and priority of Chinese Patent Application No. 2023111500715, filed with the China National Intellectual Property Administration on Sep. 7, 2023, the disclosure of which is incorporated by reference herein in its entirety as part of the present application.

TECHNICAL FIELD

The present disclosure relates to the technical field of manipulators, and in particular, to an autonomous operation decision-making method of a picking manipulator.

BACKGROUND

The research and development of a picking manipulator having an autonomous full-automatic harvesting function to take the place of or assist a person with picking fruits may be an effective way for reducing a production cost and improving industrial benefits.

At present, fruits for which the picking manipulator is mainly used are supported on stalks and grow with great randomness. The fruits and the stalks are different in morphology. A robot needs to accurately operate on plant tissues in a highly unstructured environment. However, due to a complex morphology of fruit stalks, in actual picking, the robot is prone to grazing fruits and branches in an action process, causing damage to the fruits and the branches and easily resulting in a picking failure.

SUMMARY

The present disclosure provides an autonomous operation decision-making method of a picking manipulator to solve the problem that a robot is prone to grazing fruits and branches in an action process, causing damage to the fruits and the branches and easily resulting in a picking failure, in the prior art.

The present disclosure provides an autonomous operation decision-making method of a picking manipulator, where the picking manipulator is provided with an end effector configured to pick a fruit off a branch;

the autonomous operation decision-making method of a picking manipulator including:

acquiring sample images of fruits and branches and constructing a plurality of virtual scenes, where each of the plurality of virtual scenes includes a picking manipulator model, a fruit model, and a branch model;

in the virtual scene, determining a target picking point and a target picking plane of an end effector model, and inputting azimuth information of the target picking point and the target picking plane as parameters to a reward function;

performing reinforcement learning training on picking action flows of the picking manipulator in the plurality of virtual scenes according to the reward function to determine an optimal picking action function; and controlling the picking manipulator to execute a picking task in an actual environment according to the optimal picking action function.

According to the autonomous operation decision-making method of a picking manipulator provided in the present disclosure, the performing reinforcement learning training on picking action flows of the picking manipulator in the plurality of virtual scenes according to the reward function to determine an optimal picking action function may include:

repeatedly simulating the picking action flows of the picking manipulator in the plurality of virtual scenes;

obtaining action information of the picking manipulator model in the simulation process and inputting the action information to the reward function to calculate a total reward value;

determining an optimal picking action flow corresponding to each virtual scene based on the total reward value; and determining the optimal picking action function based on the virtual scenes and the corresponding optimal picking action flows.

According to the autonomous operation decision-making method of a picking manipulator provided in the present disclosure, the action information may include a position and a direction of the end effector model, whether the picking manipulator model collides with other models, and an action parameter of each motion joint of the picking manipulator model; and the obtaining action information of the picking manipulator model in the simulation process and inputting the action information to the reward function to calculate a total reward value may include:

obtaining the position of the end effector model, and calculating an approaching goal reward based on the position of the end effector model and a position of the target picking point;

obtaining the direction of the end effector model, and calculating a picking posture reward based on directions and positions of the target picking plane and the end effector model;

obtaining the action parameter of each joint of the picking manipulator model and calculating a smooth trajectory reward;

calculating an obstacle avoidance reward based on whether the picking manipulator model collides with other models; and calculating the total reward value based on the approaching goal reward, the picking posture reward, the smooth trajectory reward, and the obstacle avoidance reward.

According to the autonomous operation decision-making method of a picking manipulator provided in the present disclosure, the calculating an approaching goal reward based on the position of the end effector model and a position of the target picking point may include:

calculating a first distance between the end effector model and the target picking point based on the position of the end effector model and the position of the target picking point;

when the first distance is greater than a first preset distance, calculating the approaching goal reward based on the first preset distance and the first distance; and when the first distance is less than or equal to the first preset distance, calculating the approaching goal reward based on the first distance.

According to the autonomous operation decision-making method of a picking manipulator provided in the present disclosure, the calculating a picking posture reward based on directions and positions of the target picking plane and the end effector model may include:

setting a target picking region surrounding the target picking point in the vicinity of the target picking point;

when the end effector model is located outside the target picking region, setting the picking posture reward to be equal to a first negative constant; and when the end effector model is located within the target picking region, calculating the picking posture reward based on the direction of the end effector model and the direction of the target picking plane.

According to the autonomous operation decision-making method of a picking manipulator provided in the present disclosure, the calculating an obstacle avoidance reward based on whether the picking manipulator model collides with other models may include:

when the picking manipulator model collides with other models, setting the obstacle avoidance reward to be equal to a second negative constant; and when the picking manipulator model does not collide with other models, setting the obstacle avoidance reward to be equal to zero.

According to the autonomous operation decision-making method of a picking manipulator provided in the present disclosure, the target picking region may be located on a side of the branch model that faces towards the picking manipulator model.

According to the autonomous operation decision-making method of a picking manipulator provided in the present disclosure, the branch may include a fruit stem and a main stalk, and two ends of the fruit stem may be connected to the fruit and the main stalk, respectively;

the branch model may include a first cylinder and a second cylinder; the first cylinder may have a size and an extension direction that are identical to a size and an extension direction of the main stalk, and be configured to simulate the main stalk; and the second cylinder may have a size and an extension direction that are identical to a size and an extension direction of the fruit stem, and be configured to simulate the fruit stem;

the fruit model may include a third cylinder; and the third cylinder may have a size and an extension direction that are identical to a size and an extension direction of the fruit, and be configured to simulate the fruit.

According to the autonomous operation decision-making method of a picking manipulator provided in the present disclosure, the target picking point may be on the second cylinder; the target picking plane may pass through the target picking point; and the target picking plane may be perpendicular to a plane of the branch model and parallel to the first cylinder.

According to the autonomous operation decision-making method of a picking manipulator provided in the present disclosure, the controlling the picking manipulator to execute a picking task in an actual environment according to the optimal picking action function may include:

determining input parameters for the optimal picking action function based on images of a fruit and a branch;

inputting the input parameters to the optimal picking action function to obtain an optimal picking action flow; and controlling the picking manipulator to complete picking according to the optimal picking action flow.

According to the autonomous operation decision-making method of a picking manipulator of the present disclosure, a virtual scene including a fruit model, a branch model, and a picking manipulator model is constructed based on images of a fruit and a branch to simulate an actual picking scene more flexibly and efficiently, and the cost and risk of conducting experimental trials and errors in the actual picking scene are reduced. The target picking point and the target picking plane of the end effector model are determined and input to the reward function so that the reward function can excite and guide the end effector model to reach the target picking point at a desired picking gesture in reinforcement learning training. Finally, the reinforcement learning training is performed on the picking action flow of the picking manipulator according to the reward function to ultimately determine the optimal picking action function. The optimal picking action function may provide guidance and reference for an actual picking action of the picking manipulator so that the picking manipulator, in actual picking, can reach a desired picking position at a desired picking posture to complete picking. Collision and damage of fruits and branches can be avoided and the success rate of picking can be increased. The problem that the robot is prone to grazing fruits and branches in the action process, causing damage to the fruits and the branches and easily resulting in the picking failure, in the prior art can be solved.

BRIEF DESCRIPTION OF THE DRAWINGS

To describe the technical solutions in the present disclosure or in the prior art more clearly, the accompanying drawings required for describing embodiments or the prior art will be briefly described below. Apparently, the accompanying drawings in the following description show some embodiments of the present disclosure, and a person of ordinary skill in the art may still derive other drawings from these accompanying drawings without creative efforts.

FIG. 1 is a first flowchart of an autonomous operation decision-making method of a picking manipulator provided in an embodiment of the present disclosure;

FIG. 4 is a second flowchart of an autonomous operation decision-making method of a picking manipulator provided in an embodiment of the present disclosure;

LIST OF REFERENCE NUMERALS

1—fruit model; 2—branch model; 3—picking manipulator model; 4—target picking point; 5—target picking plane;

11—third cylinder; 21—first cylinder; 22—second cylinder; 31—end effector model;

510—scene construction model; 520—first determination module; 530—reinforcement learning model; 540—execution module;

610—processor; 620—communication interface; 630—memory; and 640—communication bus.

DETAILED DESCRIPTION OF THE EMBODIMENTS

To make the objectives, technical solutions, and advantages of the present disclosure clearer, the technical solutions in the present disclosure will be described clearly and completely below with reference to the accompanying drawings in the present disclosure. Apparently, the described embodiments are part of rather than all of the embodiments of the present disclosure. All other embodiments derived from the embodiments of the present disclosure by a person of ordinary skill in the art without creative efforts shall fall within the protection scope of the present disclosure.

The autonomous operation decision-making method of a picking manipulator provided in the present disclosure is described below with reference to FIG. 1 to FIG. 4.

Figure 2:
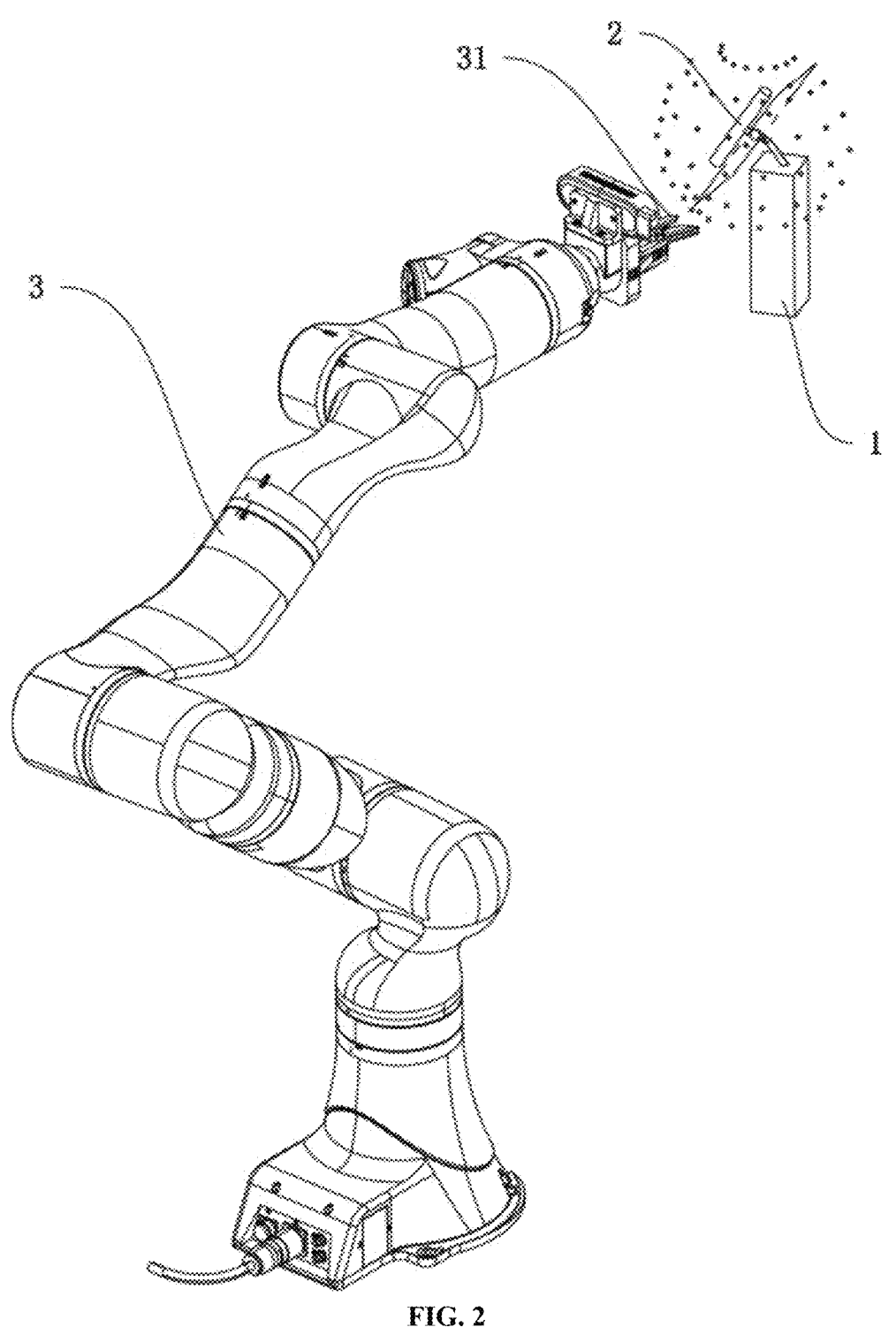
FIG. 2 is schematic diagram of a virtual scene provided in an embodiment of the present disclosure.
Figure 3:
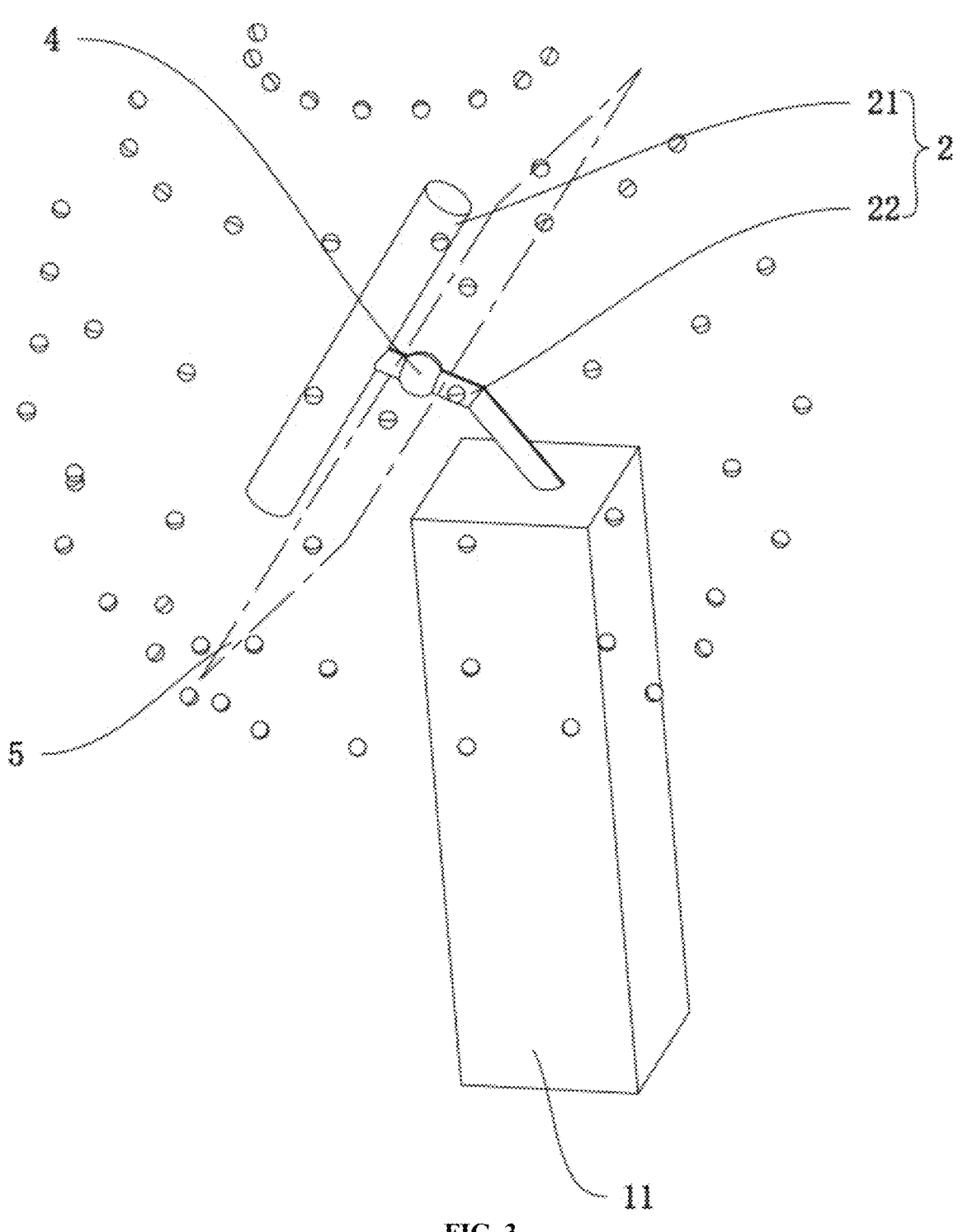
FIG. 3 is a schematic diagram of a fruit model and a branch model provided in an embodiment of the present disclosure.

As shown in FIG. 1 to FIG. 3, the picking manipulator is provided with an end effector configured to pick a fruit off a branch.

The autonomous operation decision-making method of a picking manipulator provided in the present disclosure includes the following steps.

At step S101, sample images of fruits and branches are acquired and a plurality of virtual scenes are constructed, where each of the plurality of virtual scenes includes a picking manipulator model, a fruit model, and a branch model.

At step S102, in a virtual scene, a target picking point and a target picking plane of an end effector model are determined, and azimuth information of the target picking point and the target picking plane is input as parameters to a reward function.

At step S103, reinforcement learning training is performed on picking action flows of the picking manipulator in the plurality of virtual scenes according to the reward function to determine an optimal picking action function.

At step S104, the picking manipulator is controlled to execute a picking task in an actual environment according to the optimal picking action function.

In the present embodiment, the autonomous operation decision-making method of a picking manipulator of the present disclosure is usually used to make a decision for the picking action flow of the picking manipulator before picking a fruit. Firstly, a crop plant sample to be picked is selected. A fruit and a branch of the sample are photographed by a device such as a visual sensor and a camera. A corresponding fruit model 1 and a corresponding branch model 2 are established based on the sample images of the fruit and the branch, and the fruit model 1, the branch model 2, and a picking manipulator model 3 are correspondingly set in a virtual scene based on relative positions of a picking manipulator, the fruit, and the branch to simulate an actual picking scene, so as to perform reinforcement learning training on the picking action flow. Specifically speaking, a large number of crop plant samples may be selected to establish the fruit models 1 and the branch models 2 that are different in morphology and position, and then different virtual scenes may be constructed to simulate different actual picking scenes. Alternatively, the positions and angles of the fruit model 1 and the branch model 2 of the virtual scene are directly adjusted to construct different virtual scenes to simulate different actual picking scenes.

After the completion of constructing the virtual scene, the target picking point 4 of the end effector model 31 is determined on the branch model 2. The target picking point 4 is a desired contact point of the end effector model 31 with the branch model 2 in simulated picking. The target picking point 4 is usually set on a branch of the branch model 2 that is connected to the fruit model 1 so that the end effector model 31 can cut off the branch model 2 from the target picking point 4 to pick the fruit model 1. Moreover, there is a certain gap between the target picking point 4 and the fruit model 1 to avoid the picking manipulator model 3 from colliding with the fruit model 1 in the action process. After the target picking point 4 is determined, the target picking plane 5 is determined based on the target picking point 4. The target picking plane 5 is a plane in which the end effector model 31 is at a desired picking posture when reaching the target picking point 4. The target picking plane 5 may usually keep away from the fruit model 1 and the branch model 2, causing the end effector model 31 not to collide with the fruit model 1 and the branch model 2 when acting within the target picking plane 5.

After the target picking point 4 and the target picking plane 5 are determined, a position parameter (e.g., spatial coordinates) of the target picking point 4 and direction and position parameters (e.g., spatial coordinates and a normal vector) of the target picking plane 5 are input as parameters to the reward function, and the reward function is reasonably designed so that the reward function can excite the end effector model 31 of the picking manipulator model 3 to be located within the target picking plane 5 when reaching the target picking point 4 for picking in the reinforcement learning training process. Thus, the end effector model 31 is enabled to reach the target picking point 4 at the desired picking posture.

Next, the picking action flows of the picking manipulator are simulated by the picking manipulator model 3 in the plurality of virtual scenes, and the reinforcement learning training is performed in the event that the simulated picking action flow is excited and guided by the reward function to determine an optimal action trajectory so that the picking manipulator model 3 can reach the target picking point 4 at the desired picking posture and may not collide with the branch model 2 and the fruit model 1 in the action process. After repeated training in the plurality of virtual scenes, a mapping relationship between the optimal action trajectory and each parameter in a virtual scene is established, i.e., the optimal picking action function is determined.

Finally, when picking in the actual environment, the optimal picking action trajectory may be obtained by inputting the corresponding parameters in the actual environment to the optimal picking action function. A picking robot is controlled to perform picking according to the optimal picking action trajectory. The picking robot may be enabled to reach a picking position at a desired picking posture and may not collide with and damage the branches and the fruits in the action process.

According to the autonomous operation decision-making method of a picking manipulator of the present disclosure, the virtual scene including the fruit model 1, the branch model 2, and the picking manipulator model 3 is constructed based on images of the fruit and the branch to simulate the actual picking scene more flexibly and efficiently, and the cost and risk of conducting experimental trials and errors in the actual picking scene are reduced. The target picking point 4 and the target picking plane 5 of the end effector model 31 are determined and input to the reward function so that the reward function can excite and guide the end effector model 31 to reach the target picking point 4 at the desired picking gesture in reinforcement learning training. Next, the reinforcement learning training is performed on the picking action flow of the picking manipulator according to the reward function to ultimately determine the optimal picking action function. The optimal picking action function may provide guidance and reference for an actual picking action of the picking manipulator so that the picking manipulator, in actual picking, can reach a desired picking position at a desired picking posture to complete picking. Collision and damage of fruits and branches can be avoided and the success rate of picking can be increased. The problem that the robot is prone to grazing fruits and branches in the action process, causing damage to the fruits and the branches and easily resulting in the picking failure, in the prior art can be solved.

Specifically speaking, when the reinforcement learning is performed on the picking action flow of the picking manipulator, the picking manipulator model 3 with the end effector model 31 is usually regarded as a whole, and the motion and posture thereof are controlled by Hindsight Experience Replay-Soft Actor-Critic (HER-SAC) strategy algorithm of deep reinforcement learning. The whole picking action flow of the picking manipulator model 3 is planned with no need to plan intermediate action contacts. The HER-SAC algorithm uses experience replay and the designed reward function to accelerate the learning process so that the end effector model 31 of the picking manipulator model 3 can reach the target picking point 4 at the desired picking gesture and keep away from an obstacle through a stable action.

Specifically, in some embodiments, as shown in FIG. 4, step S104 of performing reinforcement learning training on picking action flows of the picking manipulator in the virtual scenes according to the reward function to determine the optimal picking action function includes the following steps.

At step S1041, the picking action flows of the picking manipulator are repeatedly simulated in the plurality of virtual scenes.

At step S1042, action information of the picking manipulator model is obtained in the simulation process and input to the reward function to calculate a total reward value.

At step S1043, an optimal picking action flow corresponding to each virtual scene is determined based on the total reward value.

At step S1044, the optimal picking action function is determined based on the virtual scenes and the corresponding optimal picking action flows.

In the present embodiment, the position parameter of the target picking point 4 and the direction and position parameters of the target picking plane 5 are input as parameters to the reward function. The picking action flows of the picking manipulator are repeatedly simulated by the simulation actions of the picking manipulator model 3 in the plurality of virtual scenes to find out errors by trials. Moreover, the action information of the picking manipulator model 3 is obtained in the action process of the picking manipulator model 3 and the corresponding total reward value is calculated according to such action information. Specifically speaking, a single picking action flow may be divided into time periods. The action information of the picking manipulator model 3 in a final state within each time period is obtained, and then the total reward value of the action flow of the picking manipulator model 3 in the time period is calculated. Thus, the picking action flow of each time period is excited and optimized. Alternatively, the total reward value of the whole picking action flow may also be calculated; the whole picking action flow is excited and guided; the reinforcement learning training is performed by repeated simulation; and the optimal picking flow in the current virtual scene is ultimately determined. Finally, after the reinforcement learning training is performed in different virtual scenes, a mapping relationship of a virtual scene and an optimal picking flow may be established, thereby obtaining the optimal picking action function. Specifically speaking, a relationship of relevant parameters (such as position and morphology parameters of the fruit model 1 and the branch model 2) of a virtual scene and an optimal picking flow may be established so as to utilize the optimal picking action function in the actual scene and obtain the optimal picking flow.

Specifically, in some embodiments, the action information includes a position and a direction of the end effector model 31 of the picking manipulator model 3, whether the picking manipulator model 3 collides with other models, and an action parameter of each motion joint of the picking manipulator model 3.

Step S1042 of obtaining motion parameters of the picking manipulator model in the simulation process and inputting the motion parameters to the reward function to calculate the total reward value includes the following steps:

obtain the position of the end effector model, and calculate an approaching goal reward based on the position of the end effector model and a position of the target picking point;

obtain the direction of the end effector model, and calculate a picking posture reward based on directions and positions of the target picking plane and the end effector model;

obtain the action parameter of each joint of the picking manipulator model and calculate a smooth trajectory reward;

calculate an obstacle avoidance reward based on whether the picking manipulator model collides with other models; and calculate the total reward value based on the approaching goal reward, the picking posture reward, the smooth trajectory reward, and the obstacle avoidance reward.

In the present embodiment, the reward function includes four parts: the approaching goal reward, the picking posture reward, the smooth trajectory reward, and the obstacle avoidance reward. The approaching goal reward is calculated based on the position of the end effector model 31 and the position of the target picking point 4 and usually used for guiding and exciting the picking manipulator model 3 to move the end effector model 31 to the target picking point 4 in the action process, so as to complete picking. The picking posture reward is calculated based on the directions and the positions of the target picking plane 5 and the end effector model 31 and used for guiding and exciting the picking manipulator model 3 to move the end effector model 31 to the target picking plane 5 in the action process such that the end effector model 31 ultimately reaches the desired picking posture. The smooth trajectory reward is calculated mainly based on the action parameter of each joint of the picking manipulator model 3 and used for estimating whether the action process of the picking manipulator model 3 is smooth, exciting and guiding the action flow of the picking manipulator model 3 to be smoother, and avoiding robot breakdown due to reasons such as an excessively large action amplitude. The obstacle avoidance reward is mainly used for estimating whether the picking manipulator model 3 collides with other models in the action process to excite and guide the picking manipulator model 3 to keep away from other models in the action flow, avoiding collision and damage of the fruit model 1 and the branch model 2 before reaching the target picking point 4. The reward function synthetically calculates the total reward value based on the four parts described above. Thus, the picking action flow of the picking manipulator model 3 is excited and guided from four aspects. The optimal picking action flow is determined after reinforcement learning training so that the end effector model 31 can reach the target picking point 4 at the desired picking posture. Meanwhile, in the motion process, the picking manipulator model 3 moves smoothly and stably, and can keep away from obstacles. The final success rate of picking is increased.

Specifically, in some embodiments, the total reward value is usually a weighted sum of the four parts: the approaching goal reward, the picking posture reward, the smooth trajectory reward, and the obstacle avoidance reward. An expression of the reward function is as follows:

$$r_t(s_t, a_t) = \omega_1 r_{goal} + \omega_2 r_{obs} + \omega_3 r_{ctrl} + \omega_4 r_{pos} \in \mathbb{R} \tag{1}$$

where $r_t(s_t, a_t)$ represents the total reward value in a state t; $s_t, a_t$ represents the action information of the picking manipulator model 3 in the state t; $r_{goal}$, $r_{obs}$, $r_{ctrl}$, and $r_{pos}$ represent the approaching goal reward, the picking posture reward, the smooth trajectory reward, and the obstacle avoidance reward in the state t, respectively; and @$_1$, @$_2$, @$_3$, and @$_4$ represent task adaptive parameters corresponding to the approaching goal reward, the picking posture reward, the smooth trajectory reward, and the obstacle avoidance reward, respectively. The four task adaptive parameters may be designed according to actual requirements to adjust the degree of influence of the reward of each part on the total reward. Thus, the magnitude of the excitation of the reward of each part is adjusted.

Specifically, in some embodiments, calculating the approaching goal reward based on the position of the end effector model and the position of the target picking point includes the following steps:

> calculate a first distance between the end effector model and the target picking point based on the position of the end effector model and the position of the target picking point;
>
> when the first distance is greater than a first preset distance, calculate the approaching goal reward based on the first preset distance and the first distance; and
>
> when the first distance is less than or equal to the first preset distance, calculate the approaching goal reward based on the first distance.

In the present embodiment, the first preset distance is set, and when the first distance between the end effector model 31 and the target picking point 4 is greater than and less than or equal to the first present distance, the approaching goal reward is calculated in two calculation ways. When the position of the end effector model 31 is distant from the target picking point 4 (beyond the first preset distance), the picking manipulator model 3 deserves a negative reward having a great absolute value (a great punishment), and the picking manipulator model 3 is thus excited and guided to move such that the end effector model 31 rapidly enters into the range of the first preset distance. When the end effector model 31 gradually approaches the target picking point 4 within the range of the first preset distance, the picking manipulator model 3 deserves a negative reward having a gradually decreasing absolute value (a gradually decreasing punishment) such that the end effector model 31 gradually approaches the target picking point 4 and avoids unstable shaking.

In a specific embodiment, a calculation formula for the approaching goal reward $r_{goal}$ is as follows:

$$r_{goal} = \begin{cases} -\dfrac{1}{2} d_{tar}^2 & d_{tar} \leq \varphi \\[2mm] -\varphi \left( |d_{tar}| - \dfrac{1}{2}\varphi \right) & d_{tar} > \varphi \end{cases} \tag{2}$$

where $d_{tar}$ represents the first distance; $\varphi$ represents the first preset distance. The first preset distance $\varphi$ may be adjusted according to an actual requirement.

Specifically, in some embodiments, calculating the picking posture reward based on the directions and the positions of the target picking plane and the end effector model includes the following steps:

> set a target picking region surrounding the target picking point in the vicinity of the target picking point;
>
> when the end effector model is located outside the target picking region, set the picking posture reward to be equal to a first negative constant; and
>
> when the end effector model is located within the target picking region, calculate the picking posture reward based on the direction of the end effector model and the direction of the target picking plane.

In the present embodiment, the target picking region is set outside the target picking point 4. When the end effector model 31 is located outside the target picking region, the picking posture reward is equal to the first negative constant. The first negative constant is usually a negative constant having a great absolute value. That is, a great punishment is given to the picking manipulator model 3 to excite and guide the picking manipulator model 3 to act rapidly such that the end effector model 31 enters into the target picking region to approach the target picking point 4 and adjust the posture. When the end effector model 31 enters into the target picking region, a picking posture reward is calculated based on the direction of the end effector model 31 and the direction of the target picking plane 5 to excite and guide the picking manipulator model 3 to adjust the direction of the end effector model 31, allowing the end effector model to be parallel to the target picking plane 5 so as to achieve the desired picking posture.

In one specific embodiment, a calculation formula for the picking posture reward $r_{pos}$ is as follows:

$$r_{pos} = \begin{cases} -\left| \dfrac{q \cdot n}{\|q\|\|n\|} \right| & q \in \Omega \\[3mm] C_1 & q \notin \Omega \end{cases} \tag{3}$$

where q represents a three-dimensional vector of the end effector model 31; n represents the normal vector of the target picking plane 5; $\Omega$ represents the target picking region; and $C_1$ represents the first negative constant.

Specifically, in some embodiments, calculating the obstacle avoidance reward based on whether the picking manipulator model collides with other models includes the following steps:

> when the picking manipulator model collides with other models, the obstacle avoidance reward be equal to a second negative constant; and
>
> when the picking manipulator model does not collide with other models, the obstacle avoidance reward be equal to zero.

In the present embodiment, when the picking manipulator model 3 collides with other models, the picking manipulator model 3 deserves a great punishment to guide and excite the picking manipulator model 3 to keep away from other models in the action process.

In one specific embodiment, a virtual environment is constructed by MuJoCo environment. The fruit model 1, the branch model 2, and the picking manipulator model 3 in the MuJoCo environment may be set with a collision detection attribute. In the motion process of the picking manipulator model 3, whether the picking manipulator model 3 collides with the fruit model 1 and the branch model 2 may be detected by means of the collision detection attribute, and then the obstacle avoidance reward is calculated. A specific calculation formula is as follows:

$$r_{obs} = \begin{cases} C_2 & \text{if collision} \\ 0 & \text{otherwise} \end{cases} \tag{4}$$

where $C_2$ is the second negative constant; collision represents a value of the collision detection attribute of the picking manipulator model 3, which is usually a Boolean value; and when the picking manipulator model 3 collides, the value of collision is True.

In one specific embodiment, a calculation formula for the smooth trajectory reward $r_{ctrl}$ is as follows:

$$r_{ctrl} = \sqrt{\sum_{i=1}^{n_{links}} a_i^2} \tag{5}$$

where $n_{links}$ represents a number of joints of the picking manipulator model 3; $a_i$ represents the action parameter of each joint, such as a rotation angle and a displacement distance. When the action amplitude of each joint is excessively large, the picking manipulator model 3 generates a great negative reward (i.e., punishment) to guide the picking manipulator model 3 to adjust the action amplitude of each joint, making the motion smoother.

Specifically, as shown in FIG. 2 and FIG. 3, in some embodiments, the target picking region is located on a side of the branch model 2 that faces towards the picking manipulator model 3.

In the present embodiment, the target picking region is located on the side of the branch model 2 that faces towards the picking manipulator model 3 to excite and guide the picking manipulator model 3 to move on the side of the branch model 2 that faces towards the picking manipulator model 3, thereby avoiding the picking manipulator model 3 from moving across the branch model 2 to be behind the branch model 2 to increase the risk of collision and making the success rate of the whole picking action flow higher.

In some embodiments, the target picking region is further provided with a plurality of tapered grooves. The vertexes of the plurality of tapered grooves are located at the target picking point 4. Part of structure of the branch model 2 and the fruit model 1 are located in the tapered grooves to further excite and guide the picking manipulator model 3 to keep away from the fruit model 1 and the branch model 2 in the action process. Thus, the picking manipulator model 3 is avoided from colliding with the fruit model 1 and the branch model 2 in the picking action flow, thereby increasing success rate of picking.

As shown in FIG. 3, in one specific embodiment, the target picking region is hemispherical (e.g., the region surrounded by the dot matrix in the figure). The spherical surface of the hemisphere faces towards the picking manipulator model 3, and the plane of the hemisphere is the plane of the branch model 2. The target picking point 4 is located at the center of the hemisphere. Tapered grooves are formed in upper and lower sides of the hemisphere and configured to keep away from the fruit model 1 and the branch model 2.

In some embodiments, as shown in FIG. 3, a branch connected to a fruit typically includes a fruit stem and a main stalk, and two ends of the fruit stem are connected to the fruit and the main stalk, respectively. The branch model 2 includes a first cylinder 21 and a second cylinder 22. The first cylinder 21 has a size and an extension direction that are identical to a size and an extension direction of the main stalk, and is configured to simulate the main stalk. The second cylinder 22 has a size and an extension direction that are identical to a size and an extension direction of the fruit stem, and is configured to simulate the fruit stem. The fruit model 1 includes a third cylinder 11. The third cylinder 11 has a size and an extension direction that are identical to a size and an extension direction of the fruit, and is configured to simulate the fruit.

In the present embodiment, when the fruit model 1 and the branch model 2 are constructed, the actual fruit and branch are simplified. The branch model 2 is simplified as the first cylinder 21 and the second cylinder 22 and the fruit model 1 is simplified as the third cylinder 11, facilitating adjustment in the virtual scene. The branch model 2 and the fruit model 1 can be adjusted according to the fruits and the branches of different postures more flexibly and conveniently. Moreover, the computation burden of a computer in the reinforcement learning training can be reduced.

Optionally, as shown in FIG. 3, when the fruit stem is bent to a large extent, a plurality of second cylinders 22 may be constructed. The plurality of second cylinders 22 are orderly connected at an angle to simulate the bent fruit stem.

Specifically, as shown in FIG. 3, the target picking point 4 is on the second cylinder 22. The target picking plane 5 passes through the target picking point 4. The target picking plane 5 is perpendicular to a plane of the branch model 2 and parallel to the first cylinder 21.

In the present embodiment, in actual picking, the picking manipulator typically cuts off the fruit stem to pick the fruit. The target picking point 4 is set on the second cylinder 22 to simulate the actual picking. Meanwhile, the target picking plane 5 is perpendicular to the plane of the branch model 2 and parallel to the first cylinder 21 to guide and excite the end effector model 31 to move to the target picking plane 5 for picking, avoiding the end effector model 31 from colliding with the first cylinder 21. Thus, in actual picking, the picking manipulator is avoided from colliding with and damaging the main stalk and from damaging the plant.

In one specific embodiment, the target picking plane 5 is perpendicular to the plane of the first cylinder 21 and the second cylinder 22, and spaced apart from the first cylinder 21 by 20 mm.

Specifically, in some embodiments, step S104 of controlling the picking manipulator to execute the picking task in the actual environment according to the optimal picking action function includes the following steps:

determine input parameters for the optimal picking action function based on images of a fruit and a branch;

input the input parameters to the optimal picking action function to obtain an optimal picking action flow; and control the picking manipulator to complete picking according to the optimal picking action flow.

When the picking task is executed in the actual environment, the input parameters, such as the relative positions of the fruit, the branch, and the picking manipulator, and the morphologies of the fruit and the branch, to the optimal picking action function may be determined from the images of the fruit to be picked and the branch. The input parameters may be input to the optimal picking action function to obtain the optimal picking action flow in the current scene, and based on a robot program corresponding to the optimal picking action flow, the picking manipulator may be controlled to approach the branch to complete picking at the desired picking position according to the optimal action trajectory and the picking posture. The action is smooth and steady in the picking process; the fruit and the branch may not be collided and damaged; and the success rate of picking may be increased.

An autonomous operation decision-making system of a picking manipulator provided in the present disclosure is described below. The autonomous operation decision-making system of a picking manipulator described below may be cross-referenced with the autonomous operation decision-making method of a picking manipulator described above.

Figure 5:
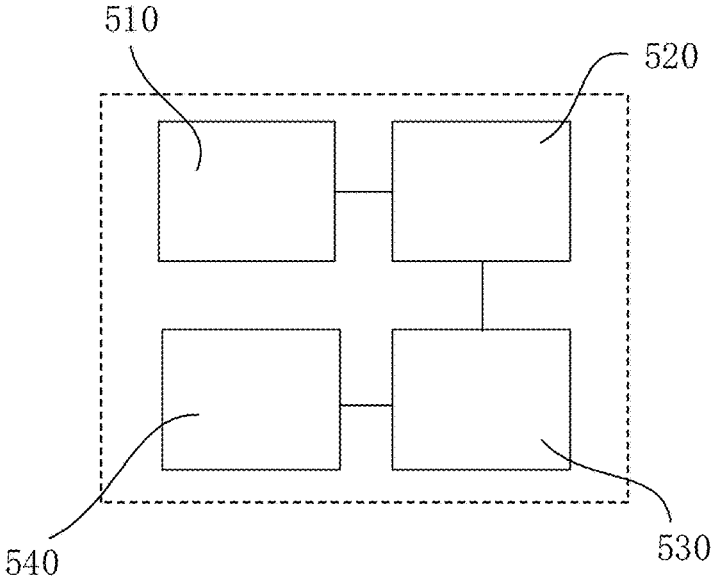
FIG. 5 is a system diagram of an autonomous operation decision-making system of a picking manipulator provided in an embodiment of the present disclosure.

As shown in FIG. 5, the autonomous operation decision-making system of a picking manipulator includes a scene construction model 510, a first determination module 520, a reinforcement learning model 530, and an execution module 540.

The scene construction model 510 is configured to acquire sample images of fruits and branches and construct a plurality of virtual scenes, where each of the plurality of virtual scenes includes a picking manipulator model, a fruit model, and a branch model. The first determination module 520 is configured to, in the virtual scene, determine a target picking point and a target picking plane of an end effector model, and input azimuth information of the target picking point and the target picking plane as parameters to a reward function. The reinforcement learning model 530 is configured to perform reinforcement learning training on picking action flows of the picking manipulator in the plurality of virtual scenes according to the reward function to determine an optimal picking action function. The execution module 540 is configured to control the picking manipulator to execute a picking task in an actual environment according to the optimal picking action function.

Figure 6:
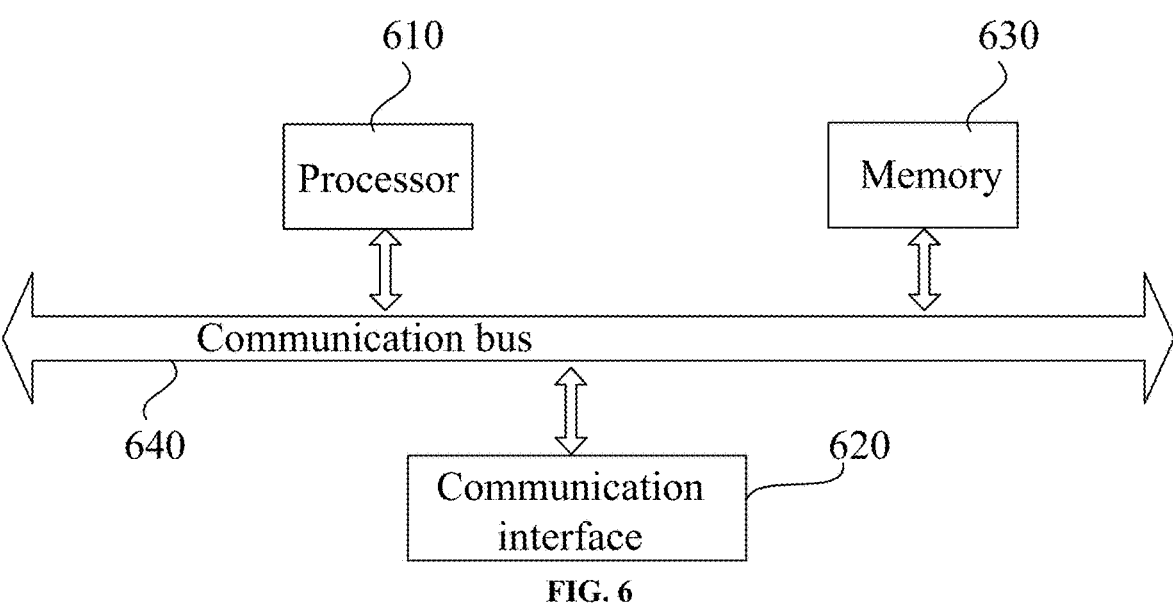
FIG. 6 is a structural schematic diagram of an autonomous operation decision-making system of a picking manipulator provided in an embodiment of the present disclosure.

FIG. 6 illustrates a schematic diagram of a physical structure of an electronic device. As shown in FIG. 6, the electronic device may include a processor 610, a communications interface 620, a memory 630, and a communication bus 640, where the processor 610, the communications interface 620, and the memory 630 communicate with one another through the communication bus 640. The processor 610 may invoke logic instructions in the memory 630 to perform the autonomous operation decision-making method of a picking manipulator provided in the above embodiments. The method includes: acquiring sample images of fruits and branches and constructing a plurality of virtual scenes, where each of the plurality of virtual scenes includes a picking manipulator model, a fruit model, and a branch model; in the virtual scene, determining a target picking point and a target picking plane of an end effector model, and inputting azimuth information of the target picking point and the target picking plane as parameters to a reward function; performing reinforcement learning training on picking action flows of the picking manipulator in the plurality of virtual scenes according to the reward function to determine an optimal picking action function; and controlling the picking manipulator to execute a picking task in an actual environment according to the optimal picking action function.

Moreover, the logic instructions in the memory 630 may be implemented as a software function unit and be stored in a computer-readable storage medium when sold or used as a separate product. Based on such understanding, the technical solutions of the present disclosure essentially or the part contributing to the prior art or part of the technical solution may be implemented in a form of a software product. The computer software product may be stored in a storage medium, and includes several instructions for enabling a computer device (which may be a personal computer, a server, a network device, or the like) to perform all or some steps of the method according to each of the embodiments of the present disclosure. The foregoing storage medium includes any medium that can store a program code, such as a universal serial bus (USB) flash disk, a mobile hard disk, a read-only memory (ROM), a random access memory (RAM), a magnetic disk, or an optical disk.

In another aspect, the present disclosure further provides a computer program product including a computer program. The computer program may be stored on a non-transitory computer-readable storage medium. The computer program, when executed by a processor, causes a computer to perform the autonomous operation decision-making method of a picking manipulator provided in each above embodiment. The method includes: acquiring sample images of fruits and branches and constructing a plurality of virtual scenes, where each of the plurality of virtual scenes includes a picking manipulator model, a fruit model, and a branch model; in the virtual scene, determining a target picking point and a target picking plane of an end effector model, and inputting azimuth information of the target picking point and the target picking plane as parameters to a reward function; performing reinforcement learning training on picking action flows of the picking manipulator in the plurality of virtual scenes according to the reward function to determine an optimal picking action function; and controlling the picking manipulator to execute a picking task in an actual environment according to the optimal picking action function.

In further another aspect, the present disclosure further provides a non-transitory computer-readable storage medium on which a computer program is stored. The computer program, when executed by the processor, implements the autonomous operation decision-making method of a picking manipulator provided in each above embodiment. The method includes: acquiring sample images of fruits and branches and constructing a plurality of virtual scenes, where each of the plurality of virtual scenes includes a picking manipulator model, a fruit model, and a branch model; in the virtual scene, determining a target picking point and a target picking plane of an end effector model, and inputting azimuth information of the target picking point and the target picking plane as parameters to a reward function; performing reinforcement learning training on picking action flows of the picking manipulator in the plurality of virtual scenes according to the reward function to determine an optimal picking action function; and controlling the picking manipulator to execute a picking task in an actual environment according to the optimal picking action function.

The embodiments described above are merely illustrative. Some or all of the modules may be selected according to actual needs to achieve one of the objectives of the solution of this embodiment. A person of ordinary skill in the art can understand and implement the embodiments without creative efforts.

Finally, it should be noted that the foregoing embodiments are only used to illustrate the technical solutions of the present disclosure, and are not intended to limit the present disclosure. Although the present disclosure is described in detail with reference to the foregoing embodiments, a person of ordinary skill in the art should understand that he/she can still modify the technical solutions described in the foregoing embodiments, or make equivalent substitutions to some technical features therein. These modifications or substitutions do not make the essence of the corresponding technical solutions depart from the spirit and scope of the technical solutions in the embodiments of the present disclosure.

What is claimed is:

1. An autonomous operation decision-making method of a picking manipulator, wherein the picking manipulator is provided with an end effector configured to pick a fruit off a branch; and the autonomous operation decision-making method of the picking manipulator comprises:

acquiring sample images of fruits and branches and constructing a plurality of virtual scenes, wherein each of the plurality of virtual scenes comprises a picking manipulator model, a fruit model, and a branch model;

in the virtual scene, determining a target picking point and a target picking plane of an end effector model, and inputting azimuth information of the target picking point and the target picking plane as parameters to a reward function;

performing reinforcement learning training on picking action flows of the picking manipulator in the plurality of virtual scenes according to the reward function to determine an optimal picking action function; and controlling the picking manipulator to execute a picking task in an actual environment according to the optimal picking action function;

wherein the performing reinforcement learning training on picking action flows of the picking manipulator in the plurality of virtual scenes according to the reward function to determine an optimal picking action function comprises:

repeatedly simulating the picking action flows of the picking manipulator in the plurality of virtual scenes;

obtaining action information of the picking manipulator model in the simulation process and inputting the action information to the reward function to calculate a total reward value;

determining an optimal picking action flow corresponding to each virtual scene based on the total reward value; and determining the optimal picking action function based on the virtual scenes and the corresponding optimal picking action flows;

wherein the action information comprises a position and a direction of the end effector model, whether the picking manipulator model collides with other models comprising fruit models and branch models, and an action parameter of each motion joint of the picking manipulator model; and the obtaining action information of the picking manipulator model in the simulation process and inputting the action information to the reward function to calculate a total reward value comprise:

obtaining the position of the end effector model, and calculating an approaching goal reward based on the position of the end effector model and a position of the target picking point;

obtaining the direction of the end effector model, and calculating a picking posture reward based on directions and positions of the target picking plane and the end effector model;

obtaining the action parameter of each joint of the picking manipulator model and calculating a smooth trajectory reward;

calculating an obstacle avoidance reward based on whether the picking manipulator model collides with the other models; and calculating the total reward value based on the approaching goal reward, the picking posture reward, the smooth trajectory reward, and the obstacle avoidance reward;

wherein the calculating an approaching goal reward based on the position of the end effector model and a position of the target picking point comprises:

calculating a first distance between the end effector model and the target picking point based on the position of the end effector model and the position of the target picking point;

when the first distance is greater than a first preset distance, calculating the approaching goal reward based on a combination of the first preset distance and the first distance; and when the first distance is less than or equal to the first preset distance, calculating the approaching goal reward based on the first distance;

wherein the calculating a picking posture reward based on directions and positions of the target picking plane and the end effector model comprises:

setting a target picking region surrounding the target picking point in the vicinity of the target picking point;

when the end effector model is located outside the target picking region, setting the picking posture reward to be equal to a first negative constant; and when the end effector model is located within the target picking region, calculating the picking posture reward based on the direction of the end effector model and the direction of the target picking plane.

2. The autonomous operation decision-making method of a picking manipulator according to claim 1, wherein the calculating an obstacle avoidance reward based on whether the picking manipulator model collides with the other models comprises:

when the picking manipulator model collides with the other models, setting the obstacle avoidance reward to be equal to a second negative constant; and when the picking manipulator model does not collide with the other models, setting the obstacle avoidance reward to be equal to zero.

3. The autonomous operation decision-making method of a picking manipulator according to claim 1, wherein the target picking region is located on a side of the branch model that faces towards the picking manipulator model.

4. The autonomous operation decision-making method of a picking manipulator according to claim 1, wherein the branch comprises a fruit stem and a main stalk, and two ends of the fruit stem are connected to the fruit and the main stalk, respectively;

the branch model comprises a first cylinder and a second cylinder; the first cylinder has a size and an extension direction that are identical to a size and an extension direction of the main stalk, and is configured to simulate the main stalk; and the second cylinder has a size and an extension direction that are identical to a size and an extension direction of the fruit stem, and is configured to simulate the fruit stem; and the fruit model comprises a third cylinder; and the third cylinder has a size and an extension direction that are identical to a size and an extension direction of the fruit, and is configured to simulate the fruit.

5. The autonomous operation decision-making method of a picking manipulator according to claim 4, wherein the target picking point is on the second cylinder; the target picking plane passes through the target picking point; and the target picking plane is perpendicular to a plane of the branch model and parallel to the first cylinder.

6. The autonomous operation decision-making method of a picking manipulator according to claim 1, wherein the controlling the picking manipulator to execute a picking task in an actual environment according to the optimal picking action function comprises:

determining input parameters for the optimal picking action function based on images of a fruit and a branch;

inputting the input parameters to the optimal picking action function to obtain an optimal picking action flow; and controlling the picking manipulator to complete picking according to the optimal picking action flow.

* * * * *